Patented Oct. 14, 1952

2,614,061

UNITED STATES PATENT OFFICE 2,614,061

METHOD OF PREPARING DDT DISPERSIONS USING CARBOXY METHYL CELLULOSE

Conrad V. Coash, Chicago, Ill., assignor to The Sherwin-Williams Co., Cleveland, Ohio, a corporation of Ohio No Drawing. Application May 3, 1948, Serial No. 24,913

2 Claims. (Cl. 167—30)

1

This invention relates to water reducible pest control compositions, more particularly to insecticidal compositions containing a relatively high concentration of the active insecticidal ingredient, and to a method for the preparation thereof.

The expression "water reducible" is employed herein to describe compositions which are dispersible in water and which initially may be in the form of a dry powder, a wet cake, a suspension, or other suitable form. It is well known to prepare insecticidal, fungicidal, parasiticidal and other pest control compositions in which the active essential ingredient is dispersed with the assistance of a dispersing agent. Many of these compositions suffer from the disadvantage that the dispersing agent also assists in the removal of the compoition from the foliage or other object to which it has been applied. Thus, a rain after the application of certain types of pest control compositions will wash away the active essential ingredient much more readily when certain types of dispersing agents are present.

One of the difficult problems encountered in the preparation of pest control compositions is the preparation of highly concentrated compositions, as, for example, those containing in excess of about 35% of the active pest control ingredient, which are characterized by the property that they are readily water reducible. It is obviously quite important, both to the manufacturer and consumer, to ship a pest control composition in a highly concentrated form and thereby avoid the extra costs incurred when large quantities of water or solvent are present in the composition. This problem is particularly manifest in the preparation of concentrated suspensions of 1,1-bis(p-chlorophenyl) 2,2,2 trichloroethane, hereinafter referred to as DDT.

An important factor which must be considered in the preparation of more highly concentrated water reducible pest control compositions is that any auxiliary reagent should be of a character and should be used in quantities such that a film is not formed which will hide or substantially reduce the effect of the active essential ingredient or ingredients of the composition.

One of the objects of the present invention is to produce new and improved pest control compositions.

Another object of the invention is to produce new and improved highly concentrated pest control compositions.

Another object of the invention is to provide a pest control composition containing a substance

2 which can be employed in a small amount to suspend the active pest control ingredient, and which does not form a film which hides or substantially reduces the effect of the active essential ingredient.

A specific object of the invention is to produce a highly concentrated aqueous suspension of DDT in which the suspension medium is of a polar nature having the capacity of suspending relatively large crystals of the active ingredient.

Another object is to provide a method of processing highly concentrated compositions of the active pest control composition rapidly. Other objects will appear hereinafter.

In accordance with the invention, it has been found that unusual results in the preparation of water reducible pest control compositions are obtained by employing a water soluble polar cellulosic salt, preferably a water soluble cellulose glycolate (e. g., sodium cellulose glycolate, commonly referred to as carboxy methyl cellulose), in conjunction with an active essential water insoluble toxic ingredient and water.

Methyl cellulose (an alkyl cellulose) has an unusual ability to wet DDT which makes it possible to pebble mill high concentrations of DDT in water when small amounts of the water dispersible alkyl celluloses are present. By this method extremely small particle sized suspensions are achieved due to the fluidity imparted to the concentrate by the presence of the alkyl cellulose. Carboxy methyl cellulose or sodium cellulose glycolate does not function like methyl cellulose to give the necessary fluidity for ball-milling operations. It has been discovered, however, that a water dispersible cellulose glycolate does have the effect of increasing the fluidity of a DDT-water mixture, especially when the DDT is present in high concentrations of more than 30% by weight of the mixture, and that DDT is wetted more thoroughly by water in the presence of the water soluble cellulose glycolate. Furthermore, although the suspension is too heavy to pebble mill, the slurry can be fed through a high speed colloid mill (e. g., a Hy-R-Speed Mill employing Carborundum faces is preferred) to produce a coarse crystalline suspension of high concentration.

One unusual feature of the resulting product is the unexpectedly good suspension of the DDT which results in spite of the large particles. One would expect that settling would be pronounced in the concentrate, especially in view of the fact that with water soluble alkyl celluloses it has been found that fine grinding is desirable to achieve good suspension characteristics, such as with methyl cellulose-DDT concentrates previously mentioned.

The following is offered as an explanation of the unusual suspensive qualities achieved by the invention. Sodium cellulose glycolate is a large molecular structure having polar groups. It may be that the polar portion of the molecule is strongly attracted to the newly exposed surfaces of the freshly broken DDT particles or crystal fragments. This adsorption of the hydrophilic molecule may act somewhat as water wings or floats about a heavier object, and account for the non-settling characteristic of the suspension. This phenomenon is not noted when methyl cellulose or non-polar type agents are employed to produce highly concentrated suspension of DDT in aqueous media.

Another factor which has been observed is the tendency of the finished DDT-sodium cellulose glycolate-water composition to be somewhat antagonistic to further reduction with water. While the composition is water reducible, it can be observed that the water is taken up slowly, especially upon the first addition of the diluting water. This fact is some indication that the more water attractive part of the cellulose glycolate has been reduced as to its effectiveness.

Concentrates prepared in a pebble mill with methyl cellulose and those prepared according to this invention and reduced or diluted with water to about 5% DDT concentration present several interesting comparisons illustrative of the physical differences between the two systems.

If a small quantity of each of the above reduced materials is spread out on a clean glass surface and allowed to dry, the first mentioned composition with an alkyl cellulose will deposit a uniform frosty coating, whereas the composition of this invention deposits an irregular deposit which is much less dense in appearance at an equivalent concentration. This demonstrates that the particles in the latter composition are larger anad consequently fewer in number. This factor is important in the use of such a concentrate for cattle and sheep dips, where exposure to the sun tends to evaporate the smaller particles at a more rapid rate due to their extended surfaces. In such applications larger particles of the DDT are preferred.

As previously indicated, it has also been observed in direct comparison tests that the suspension of the larger particles is more effective when a water soluble salt of a cellulose glycolic acid is used as a wetting and suspending agent for DDT than when methyl cellulose is employed. An examination of drops of the comparative specimens under a microscope showed that the major proportion of particles in the cellulose glycolate-DDT suspension were within the range of from 10 to 250 microns in size and such was not the case with alkyl cellulose-DDT suspensions. Accordingly, one feature of the method and compositions of the present invention is the provision of water dilutable suspensions of water insoluble, toxic or lethal pest control agents, having an average particle size in the range from 10 to 250 microns and characterized by heat stability up to 100 degrees C.

The quantity of water soluble cellulose glycolate should be effective to hold the DDT or other water insoluble toxic substance in suspension. It should preferably be insufficient to form a protective film over the entire area of the pest control ingredients. A small amount, preferably 0.25 to 2% by weight of the suspension is usually sufficient. Excellent results have been obtained by the use of relatively small amounts of sodium cellulose glycolate or carboxy methyl cellulose, preferably less than 1% of the 2000 centipoise or high viscosity type based on the total weight of the composition. If one were to eliminate the salt of carboxy methyl cellulose and attempt to prepare a 40% DDT-60% water composition, a wet sludge would result devoid of fluidity and of little use as a water reducible composition. It would be extremely difficult to grind such a material to produce a usable concentrate for the various purposes heretofore mentioned.

The preferred compositions which are prepared as concentrates suitable for dilution with water contain a minimum of 45% by weight water.

While it is not essential to the composition, it is also expedient to include wetting agents to speed up the rate of reduction with water of the concentrate, antifoaming agents and a small amount of preservative to prevent the growth of microorganisms which may thrive in aqueous suspensions.

The preferred wetting agent is a combination of a non-ionic polyethylene glycol monoalkyl ether of the general formula $$RO(C_2H_4O)_nC_2H_4OH$$

(a product of General Dyestuff known as Emulphor DDT) and the sodium sulfosuccinate ester of a long chain fatty alcohol (e. g., Aerosol OT a product of American Cyanamid).

The antifoaming agent preferably used is an emulsified sulfonated tallow (e. g., Antifoam H, a product of American Cyanamid) which aids in the supression of foam upon diluting the composition with water, or in combining it with other aqueous products.

The preservative can be selected from a group of aromatic carboxylic acids and chlorinated phenols and cresols. Sodium orthophenyl phenate has been found quite satisfactory.

Carboxy methyl cellulose is a general or popular label applied to the polar composition resulting from the reaction between an alkali cellulose and monochloroacetic acid. In general, the grades which are of commercial interest contain from about 0.3 to about 0.8 carboxy methyl groups per each anhydroglucose unit in the cellulose molecule. The water soluble salts of carboxy methyl cellulose glycolate are obtained by a neutralization of the carboxy groups in the altered cellulose with a water soluble alkaline material, e. g., the fixed and volatile alkalies, to form sodium, potassium, ammonium and related amine salts of carboxy methyl cellulose. The most useful salt and most readily available is the sodium salt of carboxy methyl cellulose or sodium cellulose glycolate, and is the preferred salt in the compositions discussed herein, although the others are substitutes and potential equivalents therefor.

The invention is further illustrated by the following examples, in which the quantities are stated in parts by weight unless otherwise indicated.

*Example I*

40 parts 1,1-bis(p-chlorophenyl) 2,2,2 trichloroethane
60 parts water
1 part sodium carboxy methyl cellulose were weighed into a tank equipped with an agitator. The contents were thoroughly mixed until sufficient of the cellulose was solubilized to afford a fluid mixture. The batch was then passed through a colloid type mill wherein an adjustable clearance existed between two surfaces, one surface of which rotated at high velocity or R. P. M. (revolutions per minute) as compared with the other, thereby inducing a high shearing stress within the slurry. The high shear effects attrition of the suspended particles. A preferred mill is a Hy-R-Speed Mill with Carborundum face plates made by the company bearing that name located in La Canada, California.

As the product came from the colloid mill it was fed into cans and was ready for shipment, storage or immediate use.

Example II

The same quantities of ingredients were weighed into an agitator tank as above, but prior to dispersion by passage through the colloid mill 4 parts polyehtylene glycol monoalkyl ether (Emulphor DDT), 1 part of sodium sulfosuccinate ester of a long chain fatty alcohol (Aerosol OT), 2 parts of an emulsified sulfonated tallow (Antifoam H, a product of American Cyanamid), and ⅕ part of sodium orthophenyl phenate were added to the mixture and thoroughly incorporated by stirring. The batch was then homogenized by passage through the colloid mill as in Example I.

This formulation had preferred physical characteristics, inasmuch as it was more readily reduced with water than that of the first example, and was found to have less troublesome foam characteristics after reduction for use.

Example III 50 parts 1,1-bis(p-chlorophenyl)2,2,2 trichloroethane
45 parts water
1 part sodium cellulose glycolate
2 parts emulsified sulfonated tallow (Antifoam H)
⅕ part sodium orthophenyl phenate The last four named ingredients were weighed into an agitator equipped tank and, after mixing until a solution of the ingredients occurred, successive additions of the DDT were made until the mix was homogeneous. The heavy slurry formed was then homogenized by passage through a colloid mill as in Example I.

In a manner similar to that described in the examples, the invention can be applied to the production of pest control compositions containing one or more of any of the following ingredients: 1,1-bis(p-chlorophenyl)2,2,2 trichloroethane, chlorinated naphthalenes, benzene hexachloride, dichlorodiphenyl ethane, diparachlorophenyl methyl carbinol, trichlorodiphenyl ethane, difluoro diphenyl trichloroethane and pyrethyrins.

With respect to compositions containing DDT prepared in accordance with the invention, there are many novel and unexpected advantages of the invention, some of which are as follows:

(1) Very high concentrations of DDT which are stable can be prepared in accordance with the invention. When solutions and emulsifiable mixtures are used as carriers, percentages higher than 30% of the active ingredient are difficult to produce because of the limited solubility of the DDT. On the other hand, it is preferred in accordance with this invention to prepare compositions having concentrations of 35% to 50% DDT.

(2) The water reducible compositions of this invention can be added to water reducible paints without seriously increasing their viscosities, or in the case of emulsion paints, without substantially interfering with the emulsion stability.

(3) An important advantage of the compositions of the invention accrues due to their freedom from fatty solvents. Such freedom reduces unwanted toxicity to warm blooded animals to a minimum. In many heretofore proposed aqueous systems as used in conjunction with military operations, a solvent is employed to dissolve DDT. This solvent remains in the composition. The undesirable toxicity of DDT in solutions of fatty solvents has been reported in the conclusions given in Supplement No. 177 to the Public Health Reports published by the United States Public Health Service. To quote in part: "It should be pointed out that the solution of DDT in fatty oils definitely increases its toxicity . . . due to the fat solvent properties of most petroleum distillates, irritation of the skin may occur following heavy exposure." In short, it is possible for DDT to be assimilated through the skin and mucous membranes when in solution in fatty solvents. Since in the compositions of the present invention no such organic solvents are present, and the DDT is only soluble in water to the extent of about one part per million, these compositions reduce the danger of DDT assimilation to a minimum, comparable with dusting powders.

It is possible in accordance with this invention to provide highly concentrated and economical DDT insecticides which can be applied universally with less hazardous risk to useful life than are inherent in solvent-containing DDT compositions presently available commercially. For example, compositions of this invention may be reduced with water to a 5% concentration and sprayed without danger in a room where sparks or open fires may occur. Kerosene and other solvent preparations, especially when atomized as from a spray, present an explosion hazard at critical air-solvent concentrations.

This preparation can be used in leg makeup where considerable epidermis is in intimate contact with the product. It is ideally suited to the production of insecticidal paints by addition of it to the commercially available water reduced paints, or the product can be sprayed or otherwise applied upon already painted surfaces. When water reduced it can be used as a rinse or spray for clothing that is to be worn in infected and infested areas or stored. Animals can be dipped or sprayed with diluted solutions to rid them of infestation of ticks, lice, fleas, ets. As an insecticide for plant spray use, it has the novel advantage of not burning the tender plant cells with residual solvent.

Still another advantage of the invention is that it is not sensitive to loss of suspensive quality due to heating. Aqueous concentrated dispersions of the invention will withstand heating above 95 degrees C. without precipitation of the suspension medium and are more suited to tropical storage where the composition in containers may be exposed to extremes of heat. This is not true in compositions in which the suspension is effected with the water soluble alkyl celluloses (e. g., methyl and ethyl cellulose). Heat stability is also of advantage in manufacturing operations wherein the product may be heated, either by itself or in combination with other materials.

The compositions of this invention are much less thixotropic than those prepared with methyl

I claim:

1. A process of manufacture of a fluid water reducible concentrated pest control composition which comprises intermixing at least 35% by weight of 1,1-bis(p-chlorophenyl)2,2,2 trichloroethane, more than 0.25% and less than 2% by weight of a high viscosity type water soluble alkali metal salt of carboxy methyl cellulose in not less than 45% of water and passing the aqueous slurry thus formed through a clearance existing between two surfaces of an attrition mill, one surface of which is rotated at high velocities as compared with the other, thereby inducing a high shearing stress within the said aqueous slurry.

2. A process of manufacture of a fluid, water reducible suspension containing between 35% and 50% by weight of dichlorodiphenyltrichloroethane which comprises fluidizing the said toxicant with not less than 45% water and more than 0.25% but not exceeding 2% of sodium salt of carboxy methyl cellulose, and thereafter reducing the particle size of the said toxicant to between 10 and 250 microns by passing the water-wetted fluidized mass through a zone of high shearing stress.

CONRAD V. COASH.

REFERENCES CITED

The following references are of record in the file of this patent:

UNITED STATES PATENTS

| Number | Name | Date |
|---|---|---|
| 1,616,323 | Lieske et al. | Feb. 1, 1927 |
| 2,236,545 | Maxwell et al. | Apr. 1, 1941 |
| 2,329,074 | Muller | Sept. 7, 1943 |
| 2,416,460 | Smith et al. | Feb. 25, 1947 |
| 2,449,028 | Walker | Sept. 7, 1948 |
| 2,556,888 | Smith | June 12, 1951 |

OTHER REFERENCES

Mantell: Water Soluble Gums, November 1947, pages 152 to 155; Reinhold Publishing Company, New York. 167/63G.

Jones et al.: J. Econ. Ent., v. 39, No. 6, pages 735 to 740, December 1946. 167/ D. D. T.